United States Patent
Jung

(10) Patent No.: US 7,372,526 B2
(45) Date of Patent: May 13, 2008

(54) REFLECTION TYPE COLOR LIQUID CRYSTAL DISPLAY (LCD) HAVING STEP DIFFERENCE FORMING LAYERS TO CREATE THICKNESS DIFFERENCES BETWEEN REFLECTIVE AREAS AND TRANSMISSIVE AREAS

(75) Inventor: Taehyeog Jung, Yangsan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 309 days.

(21) Appl. No.: 11/081,720

(22) Filed: Mar. 17, 2005

(65) Prior Publication Data

US 2005/0179839 A1    Aug. 18, 2005

Related U.S. Application Data

(62) Division of application No. 10/318,102, filed on Dec. 13, 2002, now Pat. No. 6,972,814.

(30) Foreign Application Priority Data

Dec. 15, 2001    (KR) ............................... 2001-79713

(51) Int. Cl.
G02F 1/1335    (2006.01)
(52) U.S. Cl. ...................... 349/106; 349/113; 349/114
(58) Field of Classification Search ................ 349/106, 349/113, 114
See application file for complete search history.

(56) References Cited

U.S. PATENT DOCUMENTS 6,476,890 B1    11/2002    Funahata et al. ........... 349/113
6,608,660 B1    8/2003    Okamoto et al. ........... 349/113
6,633,353 B1    10/2003    Seki et al. .................. 349/113
6,919,944 B2 *    7/2005    Maeda ....................... 349/113
6,927,813 B2 *    8/2005    Takizawa .................... 349/106

(Continued)

FOREIGN PATENT DOCUMENTS

EP    1 014 161    6/2000

(Continued)

OTHER PUBLICATIONS

U.S. Appl. No. 10/318,102, filed Dec. 13, 2002, Taehyeog Jung, Samsung SDI Co., Ltd.

(Continued)

Primary Examiner—Huyen Ngo
(74) Attorney, Agent, or Firm—Stein, McEwen & Bui, LLP

(57) ABSTRACT

A reflection type color liquid crystal display includes a step difference forming layer installed between a reflection film and a substrate second transmissive holes formed opposite to first transmissive holes, a color filter layer with unit filter layers which are formed in a predetermined pattern and which each have a transmissive area with which the first and second transmissive holes are filled and a reflective area which extends from the transmissive area to the reflection film, a transparent front plate connected to sides of the substrate to form a predetermined interval between the transparent front plate and a transparent substrate, and a liquid crystal display portion formed between the color filter layer and a bottom surface of the transparent front plate. The step difference forming layers create differences in thickness between the reflective areas and the transmissive areas.

7 Claims, 5 Drawing Sheets

U.S. PATENT DOCUMENTS

| | | | |
|---|---|---|---|
| 6,927,818 B2 * | 8/2005 | Hinata et al. | 349/114 |
| 7,176,996 B2 * | 2/2007 | Rho | 349/114 |
| 2001/0004276 A1 * | 6/2001 | Urabe et al. | 349/106 |

FOREIGN PATENT DOCUMENTS

| | | |
|---|---|---|
| EP | 1014161 A1 * | 6/2000 |
| JP | 2000-267077 | 9/2000 |
| JP | 2000-298271 | 10/2000 |
| JP | 2001-166289 | 6/2001 |
| KR | 1999-74556 | 10/1999 |
| KR | 2001-22609 | 3/2001 |
| WO | WO 99/67680 | 12/1999 |

OTHER PUBLICATIONS

Office Action issued by Korean Intellectual Property Office in Korean Patent Application 2001-79713 on Nov. 16, 2007.

* cited by examiner

REFLECTION TYPE COLOR LIQUID CRYSTAL DISPLAY (LCD) HAVING STEP DIFFERENCE FORMING LAYERS TO CREATE THICKNESS DIFFERENCES BETWEEN REFLECTIVE AREAS AND TRANSMISSIVE AREAS

CROSS-REFERENCE TO RELATED APPLICATIONS

This application is a divisional of application Ser. No. 10/318,102 filed on Dec. 13, 2002, now U.S. Pat. No. 6,972,814. The contents of application Ser. No. 10/318,102 are hereby incorporated herein by reference in their entirety.

This application claims the benefit of Korean Patent Application No. 2001-79713 filed on Dec. 15, 2001 in the Korean Intellectual Property Office, the disclosure of which is incorporated herein by reference.

BACKGROUND OF THE INVENTION

1. Field of the Invention

The present invention relates to liquid crystal displays, and more particularly, to reflection type color liquid crystal displays (LCDs) having an improved reflection film and an improved color filter layer.

2. Description of the Related Art

Generally, reflection type LCDs use a twisted pneumatic liquid crystal or a super-twisted pneumatic liquid crystal to display a monotone picture. However, with demand for color pictures, research into reflection type color LCDs including a color filter layer is being actively conducted.

Such reflection type LCDs having a color filter layer include an LCD adopting a guest host technique, in which a black dye is mixed in a liquid crystal, and a polymer scattering technique, in which a liquid crystal is scattered on a high molecular polymer. These techniques provide a good luminance because they do not use a polarization plate, but provide a low contrast.

To solve this problem, Korean Patent Publication No. 2001-022609 discloses a reflection type LCD which reflects external light using a reflective polarization plate, or transmits light radiating from a backlight. Such a display device improves a contrast by using a reflection type polarization plate, but degrades a luminance of the display device.

To solve this problem, there is provided a conventional reflection type LCD having an LCD portion, a color filter layer, and a reflection film. The LCD portion forms a picture using a liquid crystal. The color filter layer includes a patterned red filter layer, a patterned green filter layer, and a patterned blue filter layer so as to color the picture formed by the LCD portion. The reflection film is formed below the color filter layer.

FIG. 1 shows such a reflection type LCD in which a reflection film 11 and a color filter layer 12 are deposited on a substrate 10. As shown in FIG. 1, the reflection film 11 is formed on the substrate 10 and a color filter layer 12 having patterned red, green, and blue filter layers 12R, 12G, and 12B is formed on the reflection film 11. Apertures 11a which transmit light radiating from a backlight (not shown) are formed in parts of the reflection film 11 that face the red, green, and blue filter layers 12R, 12G, and 12B.

However, in this structure, the thickness of the color filter layer 12 formed on the reflection film 11 is uniform over a transmissive area corresponding to the apertures 11a of the reflection film 11, and a reflective area of the reflection film 11. Thus, the color filter layer 12 provides a poor color reproducibility of color pictures.

SUMMARY OF THE INVENTION

Accordingly, it is an aspect of the present invention to provide a reflection type color liquid crystal display (LCD) capable of improving a color reproducibility of a transmissive area without significantly affecting a reflectability of a reflection film.

Another aspect of the present invention is to provide a reflection type color LCD capable of increasing a brightness by enhancing the reflectability of the reflection film.

Additional aspects and advantages of the invention will be set forth in part in the description which follows and, in part, will be obvious from the description, or may be learned by practice of the invention.

To achieve the above and/or other aspects of the present invention, there is provided a reflection type color LCD comprising a transparent substrate, a reflection film, a step difference forming layer, a color filter layer, and a transparent front plate. The reflection film is formed on the transparent substrate, and includes first transmissive holes which transmit light in a predetermined pattern. The step difference forming layer is installed between the reflection film and the transparent substrate, and includes second transmissive holes which are formed opposite to the first transmissive holes. The color filter layer includes unit filter layers formed in a predetermined pattern. Each of the unit filter layers has a transmissive area with which the corresponding first and second transmissive holes are filled, and a reflective area which extends from the transmissive area to the reflection film. The transparent front plate is connected to sides of the substrate so as to form a predetermined interval in between the transparent front plate and the substrate. The transparent front plate includes a liquid crystal display portion which is formed between the color filter layer and a bottom surface of itself.

Each of the unit filter layers may have an upper surface which is even, and the transmissive areas are thicker than the respective reflective areas. At least one of the step difference forming layer, the reflective areas of the color filter layer, and the reflection film may have a wavy surface so as to increase a reflectability of the light.

To achieve the above and/or other aspects of the present invention, there is provided a reflection type color LCD, wherein a color filter layer is formed on a transparent substrate and includes red, green, and blue unit filter layers which are formed in strips. Reflection films are formed between the transparent substrate and the color filter layer so as to be narrower than the red, green, and blue unit filter layers, and define reflective areas and transmissive areas of the color filter layer. The reflection films are buried in the corresponding red, green, and blue unit filter layers. The step difference forming layers are installed between the respective reflection films and the transparent substrate, and form the difference in thickness between the reflective areas and the transmissive areas of the color filter layer. A transparent front plate is connected to sides of the transparent substrate so as to form a predetermined distance in between the transparent front plate and the transparent substrate. The transparent front plate includes a liquid crystal display portion which is formed between the color filter layer and a bottom surface of the transparent front plate.

To achieve the above and/or other objects of the present invention, there is provided a reflection type color LCD according to yet another embodiment of the present invention. In this embodiment, a color filter layer having red, green, and blue unit filter layers formed parallel to each other is formed on a front plate. Transparent step difference forming layers are installed between the corresponding red, green, and blue unit filter layers and the front plate so as to be narrower than the red, green, and blue unit filter layers.

The transparent step difference forming layers define reflective areas and transmissive areas of the color filter layers and are buried in the corresponding red, green, and blue unit filter layers. A substrate is connected to sides of the front plate so as to form a predetermined interval in between them. This embodiment includes a liquid crystal display portion having first and second electrodes, orientation films, and a liquid crystal layer. The first and second electrodes are formed in a predetermined pattern on the color filter layer and the substrate, respectively, so as to face each other. The orientation films are formed on corresponding opposed surfaces of the first and second electrodes so as to bury the first and second electrodes. The liquid crystal layer is formed between the orientation films. Reflection films are formed between the corresponding second electrodes and areas of the substrate that face the step difference forming layers.

The unit filter layers may have different sizes according to a color reproducibility of the color filter layer.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
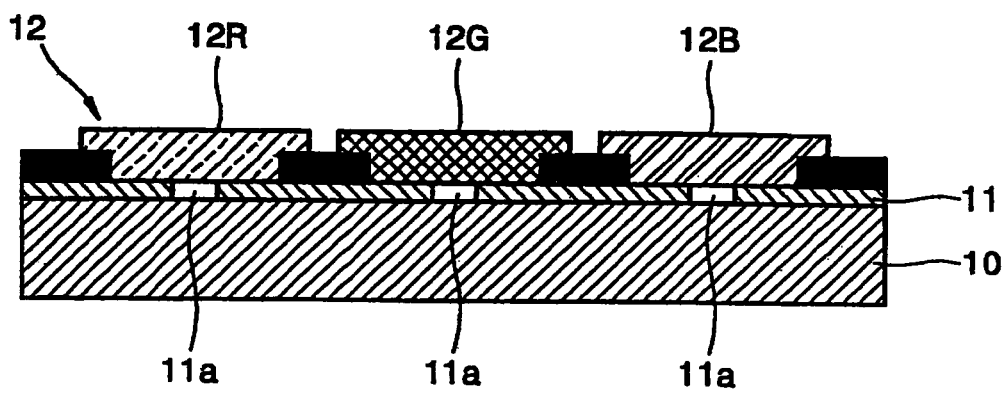
FIG. 1 is a cross-sectional view of a conventional reflection type-LCD in which a reflection film and a color filter layer are formed on a substrate.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
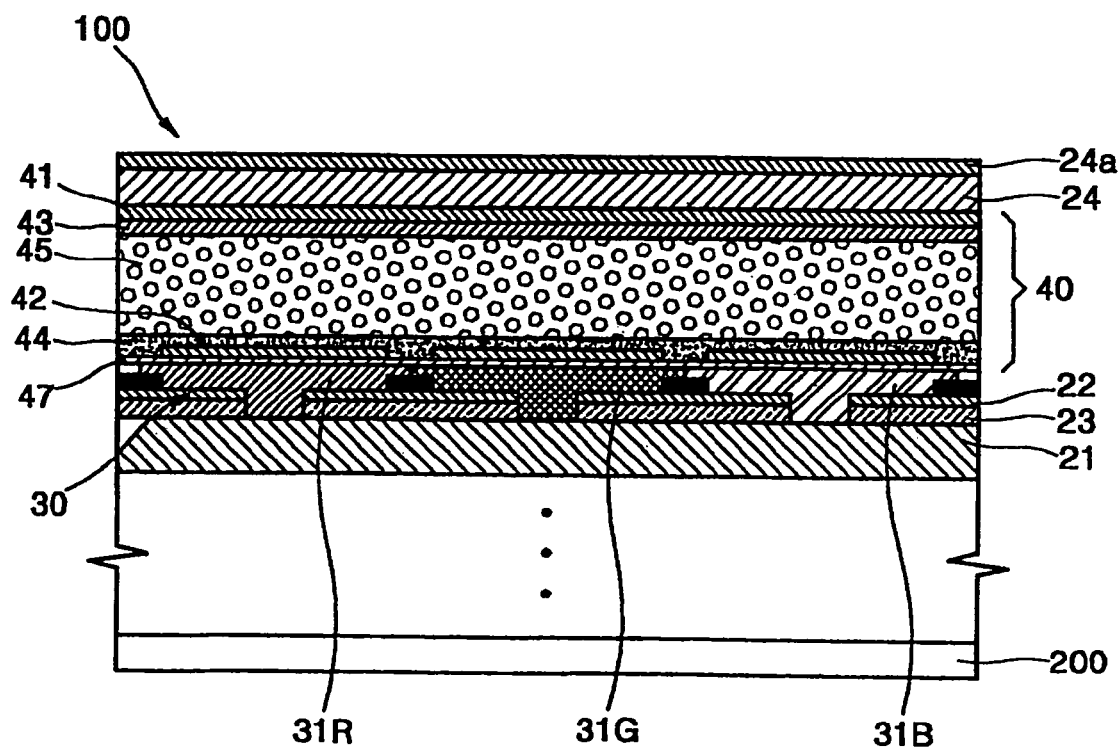
FIG. 2 is a cross-sectional view of a reflection type color liquid crystal display (LCD) according to an embodiment of the present invention.

FIG. 2 shows a reflection type liquid crystal display (LCD) 100 according to an embodiment of the present invention. As shown in FIG. 2, a reflection film 22 which demarcates a transmissive area and a reflective area is formed on a transparent substrate 21. A color filter layer 30 having unit filter layers 31R, 31G, and 31B, in the same pattern as the configuration of pixels to form color pictures, is formed on the reflection film 22. A step difference forming layer 23 is formed between the substrate 21 and the reflection film 22 to form a step difference between the transmissive area and reflective area of the unit filter layers 31R, 31G, and 31B. The substrate 21 is connected to sides of a front plate 24 so as to form a predetermined interval in between them. A LCD portion 40 is formed on a lower surface of the front plate 24 and an upper surface of the color filter layer 30.

Figure 3:
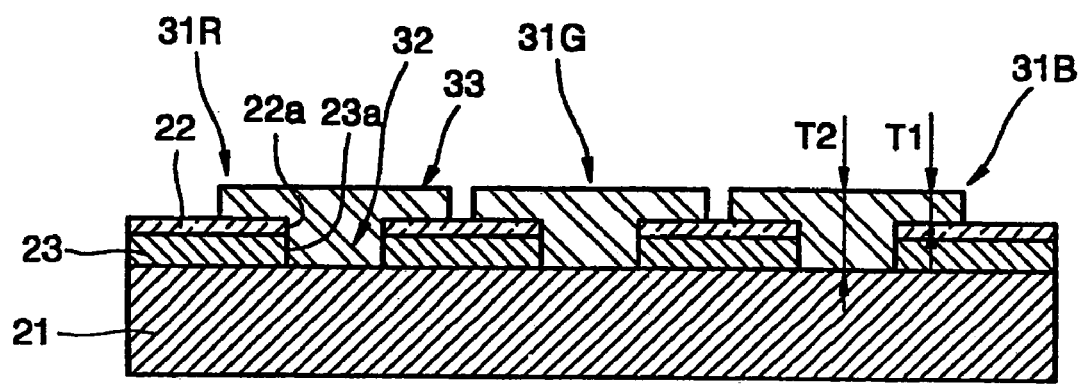
FIG. 3 is a cross-sectional view of a structure in which a reflection film and a color filter layer are formed on a substrate, according to an aspect of the present invention.
Figure 4:
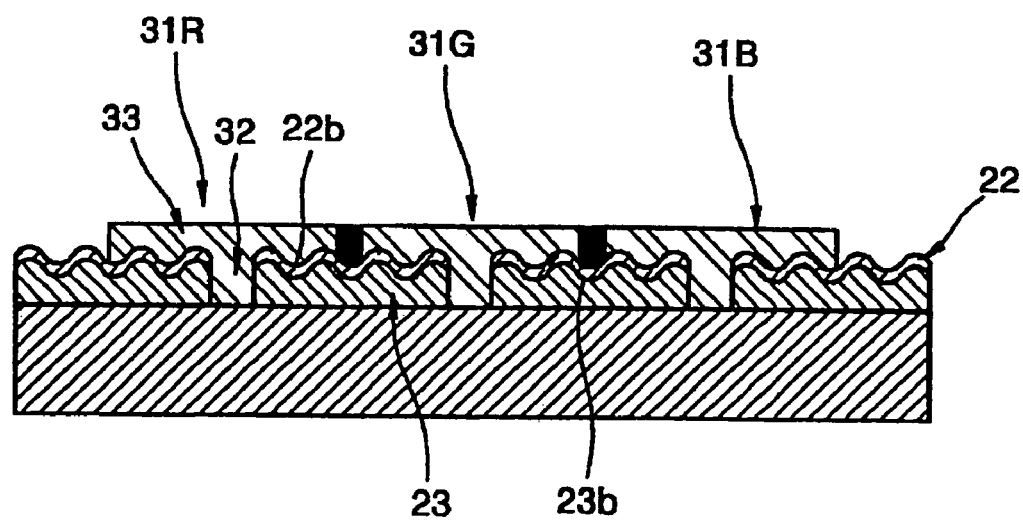
FIG. 4 is a cross-sectional view of a structure in which a reflection film and a color filter layer are formed on a substrate, according to another aspect of the present invention.

FIGS. 3 and 4 show detailed structures of the LCD 100 of FIG. 1, according to aspects of the present invention, in which the color filter layer 30, the reflection film 22, and the step difference forming layer 23 are stacked on the substrate 21.

As shown in FIG. 3, the step difference forming layer 23 formed on the substrate 21 has second transmissive holes 23a in the same pattern as an arrangement pattern of red, green, and blue colors to form a picture. The second transmissive holes 23a can have different sizes depending on a color reproducibility of the color filter layer 30 and a color temperature. The reflective film 22 formed on the step difference forming layer 23 has first transmissive holes 22a formed directly over the second transmissive holes 23a.

As shown in FIG. 4, the reflection film 22 can have a wavy surface 22b to increase a reflectability of external light. The wavy surface 22b can be formed by forming the reflection film 22 along a wavy surface 23b of the step difference forming layer 23.

Each of the unit filter layers 31R, 31G, and 31B of the color filter layer 30 includes a transmissive area 32 which is formed in the coaxially-formed first and second transmissive holes 22a and 23a, and a reflective area 33 which extends from the transmissive area 32 to cover an area of the reflection film 22. Each of the unit filter layers 31R, 31G, and 31B having the transmissive and reflective areas 32 and 33 has an even upper surface. The transmissive area 32 is formed to a thickness T2, which is greater than a thickness T1 of the reflective area 33, by filling the first and second transmissive holes 22a and 23a with a unit filter layer material. For example, the step difference forming layer 23 which creates a difference in thickness between the transmissive area 32 and the reflective area 33 that form each of the unit filter layers 31R, 31G, and 31B, is formed to a thickness of about 0.1 to 0.2 μm.

Referring back to FIG. 2, the LCD portion 40 formed between the color filter layer 30 and the bottom surface of the front plate 24 includes first and second electrodes 41 and 42, orientation films 43 and 44, and a liquid crystal layer 45. The first and second electrodes 41 and 42 are transparent and formed in predetermined patterns on the bottom surface of the front plate 24 and on the upper surface of the color filter layer 30, respectively. The orientation films 43 and 44 have rubbed surfaces and are formed on the front plate 24 and the color filter layer 30, respectively, such that the first and second electrodes 41 and 42 are buried in the orientation films 43 and 44, as shown in FIG. 2. The liquid crystal layer 45 is installed between the orientation films 43 and 44. A transparent dielectric layer 47 can be further installed on the color filter layer 30.

Additionally, a polarization plate 24a can be installed on at least one surface of the outer surface of the substrate 21 and that of the front plate 24. Also, a backlight 200 can be installed below the substrate 21.

In the reflection type color LCD 100 having the above-described structure, where a predetermined voltage is applied to the first and second electrodes 41 and 42, the liquid crystal in the liquid crystal layer 45 is oriented in a predetermined pattern so as to selectively transmit light, thereby forming a picture. In this operation, where a back light is not needed, light is transmitted by the liquid crystal layer 45, again transmitted by the reflective areas 33 of the unit filter layers 31R, 31G, and 31B, and then reflected by the reflection film 32, thereby forming a color picture. On the other hand, where light from the backlight 200 is required, the light generated from the backlight 200 is transmitted by the transmissive areas 32 of the unit filter layers 31R, 31G, and 31B and the liquid crystal layer 45 to create a color picture. As described above, the transmissive areas 32 are thicker than the reflective areas 33. Accordingly, a color reproducibility of the color picture is improved.

Figure 5:
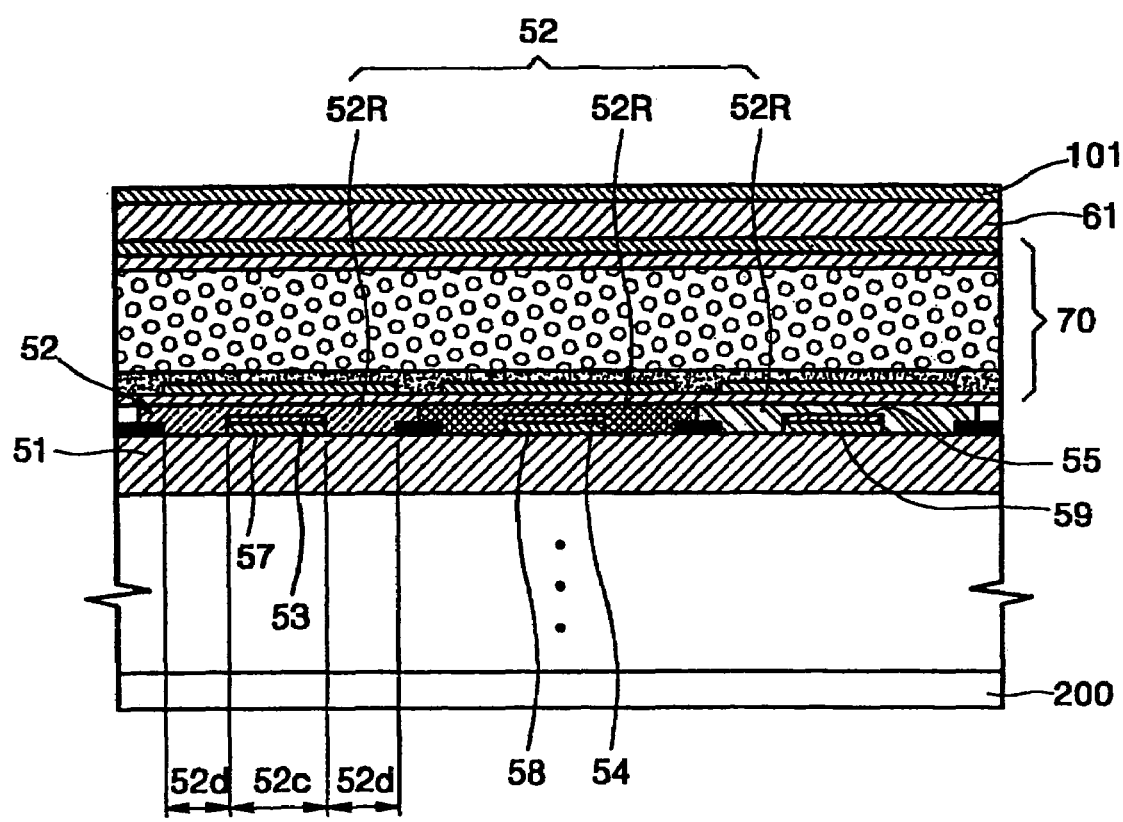
FIG. 5 is a cross-sectional view of a reflection type color LCD according to another embodiment of the present invention.
Figure 6:
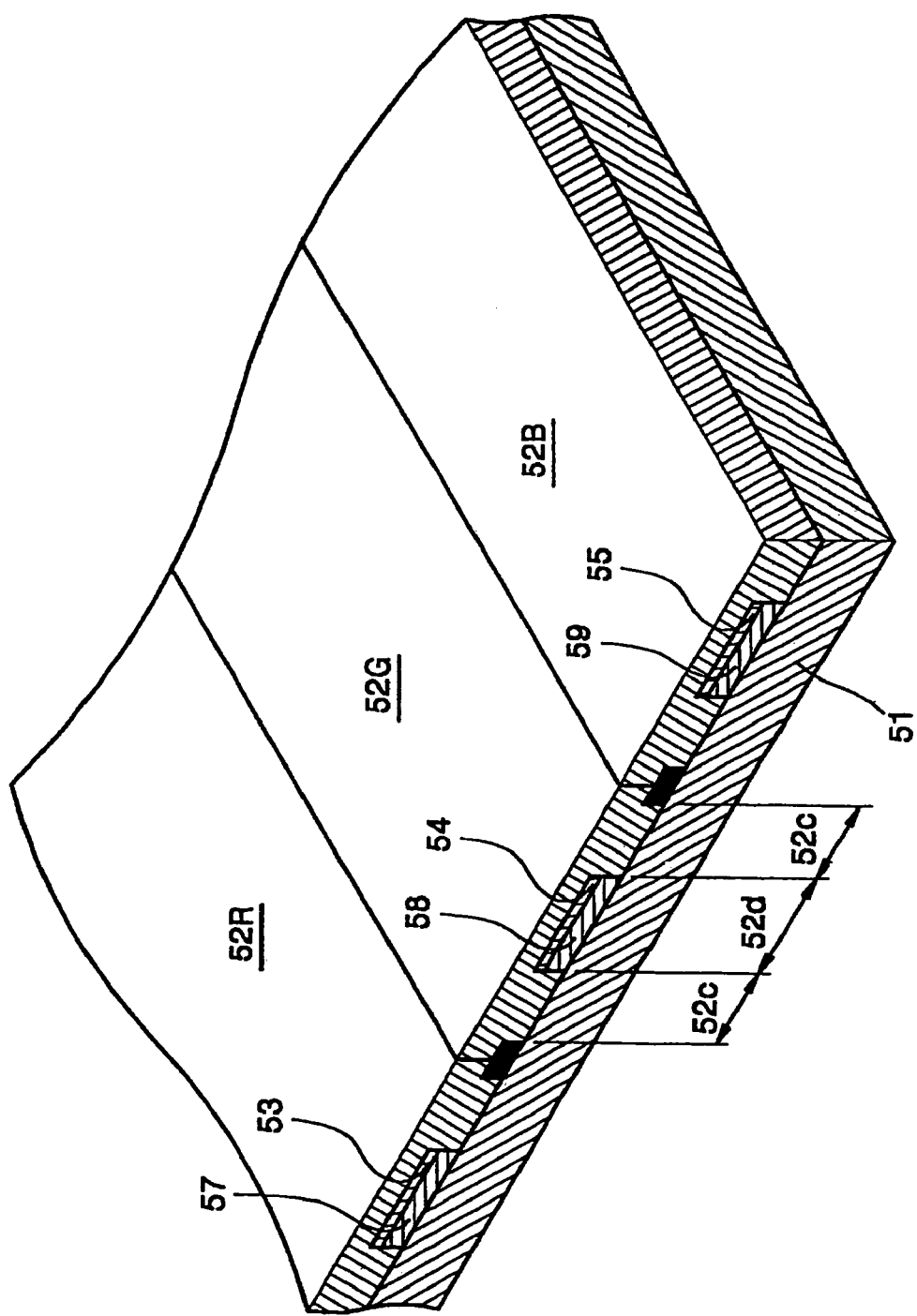
FIG. 6 is a perspective view of the structure in which a reflection film and a color filter layer are formed on a substrate, the structure shown in FIG. 5.

FIGS. 5 and 6 show a reflection type color LCD according to another embodiment of the present invention. As shown in FIG. 5, a color filter layer 52 having red, green, and blue unit filter layers 52R, 52G, and 52B, in strips, is formed on a transparent substrate 51. Reflection films 53, 54, and 55 are formed between the transparent substrate 51 and the unit filter layers 52R, 52G, and 52B so as to be thinner than the unit filter layers 52R, 52G, and 52B, respectively, and accordingly define a reflective area 52c and a transmissive area 52d. The reflection films 53, 54, and 55 are buried in the unit filter layers 52R, 52G, and 52B, respectively. Step difference forming layers 57, 58, and 59 are installed between the reflection films 53, 54, and 55 and the substrate 51, and create a difference in thickness between the reflective area 52c and transmissive area 52d of each of the unit filter layers 52R, 52G, and 52B. According to an aspect of the present invention, the step difference forming layers 57, 58 and 59, and the reflection films 53, 54 and 55 have irregular surfaces so as to improve a reflectability of external light.

The perimeter of the substrate 51 is coupled to that of the front plate 61 so as to form a predetermined interval in between them. An LCD portion 70 is formed between a bottom surface of the front plate 61 and an upper surface of the color filter layer 52. The LCD portion 70 is the same as the LCD portion of FIG. 2, and therefore, will not be described below.

In the reflection type LCD having the above-described structure, the reflective area 52c and transmissive area 52d of each of the unit filter layers 52R 52G and 52B are different in thickness due to the formation of the reflection films 53, 54, and 55 and the step difference forming layers 57, 58, and 59. This improves a color reproducibility of a color picture.

Figure 7:
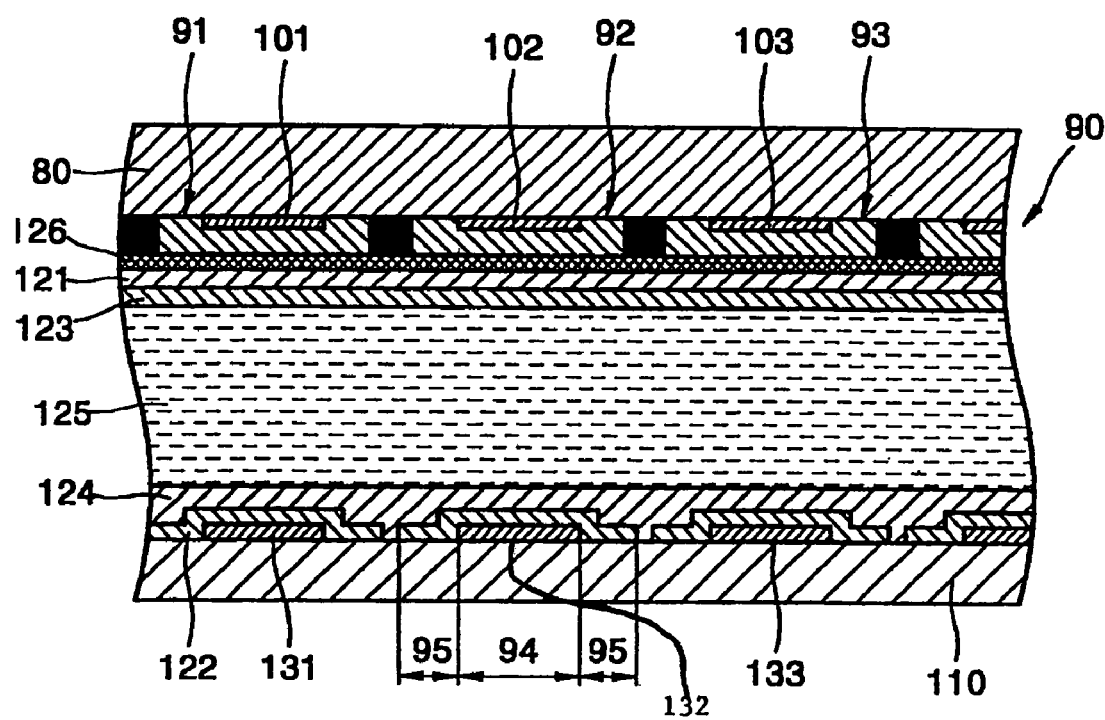
FIG. 7 is a cross-sectional view of a reflection type color LCD according to yet another embodiment of the present invention.

FIG. 7 shows a reflection type color LCD according to yet another embodiment of the present invention. As shown in FIG. 7, a color filter layer 90 having red, green, and blue unit filter layers 91, 92, and 93 parallel to one another is formed on one side of a front plate 80. Transparent step difference forming layers 101, 102, and 103 are formed between the front plate 80 and the unit filter layers 91, 92, and 93 so as to be narrower than the unit filter layers 91, 92, and 93, respectively, and accordingly define a reflective area 94 and a transmissive area 95. The transparent step difference forming layers 101, 102, and 103 are buried in the unit filter layers 91, 92, and 93, respectively. For example, the step difference forming layers 101, 102, and 103 are formed of an organic material.

A substrate 110 is connected to sides of the front plate 80 so as to form a predetermined distance in between them. First and second electrodes 121 and 122 are formed in predetermined patterns on the color filter layer 90 and the substrate 110, respectively. Orientation films 123 and 124 are formed on the first and second electrodes 121 and 122, respectively, so as to bury them. A transparent planarization film 126 can be further formed between the color filter layer 90 and the first electrode 121.

Reflection films 131, 132, and 133 are formed between the substrate 110 and the second electrodes 122 so as to face the corresponding step difference forming layers 101, 102, and 103. A liquid crystal layer 125 is formed between the orientation films 123 and 124.

In the embodiment described above, widths of the step difference forming layers 101, 102, and 103 are the same as those of the reflection films 131, 132, and 133. The transmissive areas 95 of the unit filter layers 91, 92, and 93 are thicker than the reflective areas 94 thereof. The unit filter layers 91, 92, and 93 can have different sizes depending on a color reproducibility of the color filter layer 90.

In a color LCD having a structure as described above, unit filter layers corresponding to red, green, and blue pixels have different-sized transmissive and reflective areas. Accordingly, transmissivity is different for each pixel in a transmission mode. Therefore, the luminance and color reproducibility of an image can be improved.

A result of an experiment on the luminance and color reproducibility, depending on the difference in thickness between the transmissive and reflective areas of a unit filter layer, is shown in Table 1.

TABLE 1

| | Transmissive area | | | Reflective area | | |
|---|---|---|---|---|---|---|
| | Thickness of unit filter layer (μm) | Color reproducibility (%) | Luminance (%) | Thickness of unit filter layer (μm) | Color reproducibility (%) | Luminance (%) |
| Conventional reflection type LCD | 0.75 | 4.9 | 64.4 | 0.75 | 4.9 | 64.6 |
| Reflection type LCD according to the present invention | 1.47 | 14.6 | 50.2 | 0.75 | 4.9 | 64.6 |

As shown from the result of Table 1, a reflection type LCD of the present invention has a significantly improved color reproducibility compared to that of a conventional reflection type LCD. In the reflection type LCD of the present invention, where reflection films have an irregular surface and the difference in thickness between a reflection area and a transmissive area of a unit filter layer is large, the color reproducibility is increased three times or greater than the conventional reflection type LCD.

A reflection type LCD according to the present invention as described above includes unit filter layers, each having a reflective area and a transmissive area having different thicknesses to improve a color reproducibility. Furthermore, a color purity and luminance of a picture can be improved.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A reflection type color liquid crystal display comprising:
   a front plate;
   a color filter layer having red, green, and blue unit filter layers formed parallel to each other on the front plate;
   transparent step difference forming layers which are installed between the corresponding red, green, and blue unit filter layers and the front plate so as to be narrower than the red, green, and blue unit filter layers, define reflective areas and transmissive areas of the color filter layer, and are buried in and spaced apart from sides of the corresponding red, green, and blue unit filter layers;
   a substrate which is connected to sides of the front plate so as to form a predetermined interval in between the substrate and the front plate;
   a liquid crystal display portion including:
      first and second electrodes which are formed in a predetermined pattern on the color filter layer and the substrate, respectively, so as to face each other,
      orientation films which are formed on corresponding opposed surfaces of the first and second electrodes so as to bury the first and second electrodes, and
      a liquid crystal layer formed between the orientation films; and
   reflection films formed between the corresponding second electrodes and areas of the substrate that face the step difference forming layers.

2. The reflection type color liquid crystal display of claim 1, wherein the step difference forming layers have the same widths as those of the respective reflection films.

3. The reflection type color liquid crystal display of claim 1, wherein the transmissive areas of the color filter layer are thicker than the reflective areas.

4. The reflection type color liquid crystal display of claim 1, wherein the red, green, and blue unit filter layers have different sizes according to a color reproducibility of the color filter layer.

5. The reflection type color liquid crystal display of claim 1, further comprising a transparent planarization film provided between the color filter layer and the first electrode.

6. A reflection type color liquid crystal display comprising:
   a substrate;
   a reflection film having a predetermined pattern provided on the substrate;
   a color filter layer having unit filter portions, wherein each of the unit filter portions includes a transmissive area and a reflective area which have different thicknesses;
   a front plate connected to the substrate so as to form a predetermined interval therebetween;
   a liquid crystal display portion formed between the front plate and the substrate; and
   step difference forming layers which are arranged between the corresponding unit filter portions and the front plate, narrower than, buried within and spaced apart from sides of the corresponding unit filter portions, and provide a thickness difference between the transmissive areas and the reflective areas.

7. The reflection type color liquid crystal display of claim 6, wherein the unit filter portions have different sizes according to a color reproducibility of the color filter layer.

* * * * *